United States Patent
Rønning et al.

[11] Patent Number: 5,832,712
[45] Date of Patent: Nov. 10, 1998

[54] METHOD FOR REMOVING CARBON DIOXIDE FROM EXHAUST GASES

[75] Inventors: Svein O. Rønning, Langesund; Yngvil Bjerve, Sandefjord; Olav Falk-Pedersen, Tønsberg; Geir Glittum, Langesund; Olav Bolland, Trondheim, all of Norway

[73] Assignee: Kvaerner Asa, Lysaker, Norway

[21] Appl. No.: 693,170

[22] PCT Filed: Feb. 14, 1995

[86] PCT No.: PCT/NO95/00033

§ 371 Date: Oct. 11, 1996

§ 102(e) Date: Oct. 11, 1996

[87] PCT Pub. No.: WO95/21683

PCT Pub. Date: Aug. 17, 1995

[30] Foreign Application Priority Data

Feb. 15, 1994 [NO] Norway ..................................... 940527

[51] Int. Cl.⁶ .................................. F02G 3/00; F02C 7/08
[52] U.S. Cl. ...................... 60/39.02; 60/39.182; 60/39.52
[58] Field of Search ................................ 60/39.02, 39.04, 60/39.182, 39.5, 39.52

[56] References Cited

U.S. PATENT DOCUMENTS

| | | | |
|---|---|---|---|
| 4,434,613 | 3/1984 | Stahl | 60/39.52 |
| 4,528,811 | 7/1985 | Stahl | 60/39.52 |

FOREIGN PATENT DOCUMENTS

| | | |
|---|---|---|
| 0020055 | 12/1980 | European Pat. Off. . |
| 0410845 | 1/1991 | European Pat. Off. . |
| 0502596 | 9/1992 | European Pat. Off. . |
| 0537593 | 4/1993 | European Pat. Off. . |
| 0551876 | 7/1993 | European Pat. Off. . |
| 0553643 | 8/1993 | European Pat. Off. . |
| 0558019 | 9/1993 | European Pat. Off. . |
| 0588175 | 3/1994 | European Pat. Off. . |
| 404091324 | 3/1992 | Japan ..................................... 60/39.52 |

*Primary Examiner*—Charles G. Freay
*Attorney, Agent, or Firm*—Jacobson, Price, Holman & Stern, PLLC

[57] ABSTRACT

A method for removing and preventing emissions into the atmosphere of carbon dioxide ($CO_2$) from exhaust gases from gas turbines for the production of oil and gas, comprising the following steps: (a) natural gas and air are introduced into a gas turbine in which natural gas is converted to mechanical energy; (b) the exhaust gas from the gas turbine is passed through a heat recovery unit for recovery of the heat content in the exhaust gas; (c) after emitting heat in the recovery unit whereby the temperature of the exhaust gas has been reduced to 20°–70° C., the exhaust gas is passed to an absorption column containing an absorption liquid, where the carbon dioxide is absorbed in the said liquid, and the thereby purified exhaust gas, essentially free of carbon dioxide, is vented to the atmosphere; (d) the absorption liquid which contains $CO_2$ is passed to a stripping column where the $CO_2$ is removed from the absorption liquid heated to a temperature of 120°–150° C.; (e) the thereby regenerated absorption liquid which is essentially free of $CO_2$ is recycled to the absorption column and the separated $CO_2$ gas is passed to a compression stage for compression and utilization or disposal; wherein approximately 40% of the exhaust gas is recycled to the compressor air inlet for said gas turbine before the exhaust gas is passed to the absorption stage (c).

5 Claims, 3 Drawing Sheets

5,832,712

METHOD FOR REMOVING CARBON DIOXIDE FROM EXHAUST GASES

BACKGROUND OF THE INVENTION

In 1989 the Norwegian government set the target that the total $CO_2$ emissions in Norway in the year 2000 should be stabilized at the 1989 level. This led to the introduction of the $CO_2$ tax in 1991, which thus motivated the Norwegian oil companies to study new methods and technologies in order thereby to reduce the total $CO_2$ emissions.

The introduction of the $CO_2$ tax on offshore combustion of natural gas has resulted in an increased interest in both energy conservation and the possibility of separating $CO_2$ from gas turbine exhaust gases.

Several special considerations have to be taken into account when developing a $CO_2$ removal process which is intended for use in offshore installations. The most crucial constraint is that space and weight are very expensive commodities offshore, and the equipment therefore has to be as compact and light weight as possible. Secondly, the $CO_2$ removal process must be installed in such a manner that maintenance of the separation unit does not interfere with the availability of the oil production process on the platform. Thirdly, the prospects for the disposal of pure $CO_2$ from offshore installations are good. $CO_2$ can be compressed and injected either into deep sea water, aquifers, depleted oil/gas reservoirs or into reservoirs which are still in production. The latter can result in enhanced oil recovery.

At the First International Conference on Carbon Dioxide Removal (1992), several studies were presented related to $CO_2$ removal from power-generating systems. De Ruyck (1992) proposed a combined $CO_2$ and steam cycle, which is an extension of the humid air turbine (HAT) cycle. Bolland and Saether (1992) proposed several alternatives for simplifying $CO_2$ removal. Several studies were published by the IEA Greenhouse Gas R & D Programme during 1992, but most of these focused on $CO_2$ abatement from coal fired power plants. Yantovskii et al. (1992, 1993) described two different concepts for power plants without emissions of $CO_2$ to air. However, these concepts are far from being commercially viable.

SUMMARY OF THE INVENTION

The present invention relates to the removal of carbon dioxide ($CO_2$) which is obtained from the combustion of hydrocarbon gases. In particular, the present invention relates to the removal of $CO_2$ from exhaust gases from heat engines, for the production and/or processing of oil and/or gas. A second aspect of the invention relates to the removal of $CO_2$ which is obtained from the combustion of natural gas in a gas turbine on an oil/gas installation.

The present invention relates to a method for removing and preventing emissions into the atmosphere of carbon dioxide ($CO_2$) from exhaust gases from gas turbines for the production of oil and gas. The invention comprises the following steps:

(a) natural gas and air are introduced into a gas turbine in which natural gas is converted to mechanical energy, (b) the exhaust gas from the gas turbine is passed through a heat recovery unit for recovery of the heat content in the exhaust gas, (c) after emitting heat in the heat recovery unit whereby the temperature of the exhaust gas has been reduced to 20°–70° C., the exhaust gas is passed to an absorption column containing an absorption liquid, where the carbon dioxide is absorbed in the said liquid, and the thereby purified exhaust gas, essentially free of carbon dioxide, is vented to the atmosphere, (d) the absorption liquid containing $CO_2$ is passed to a stripping column where the $CO_2$ is removed from the absorption liquid by heating to a temperature of 120°–150° C., (e) the thereby regenerated absorption liquid which is essentially free of $CO_2$ is recycled to the absorption column and the separated $CO_2$ gas is passed to a compression stage for compression and utilization or disposal.

The invention is characterized in that approximately 40% of the exhaust gas is recycled to the compressor air inlet for said gas turbine before the exhaust gas is passed to the absorption stage (c).

The power generation concepts have been evaluated in order to find the concept which constitutes the best possible combination of the following factors; low exhaust gas flow, high $CO_2$ concentration, high efficiency and low weight. A combined cycle with recycling of 40% of the volume of the exhaust gas back to the inlet of the compressor is the most suitable amongst the concepts studies for the removal of $CO_2$.

The object of this invention, as stated in this application, has been to evaluate the use of the existing power generation concept for offshore separation of $CO_2$ from exhaust gas. The basis of these calculations has been an LM2500PE gas turbine, since this turbine is the most commonly used in the Norwegian sector of the North Sea. The fuel gas is a typical North Sea natural gas with a lower heating value of 47.6 MJ/kg. This fuel gas produces approximately 2.5 kg of $CO_2$ per $Sm^3$ of natural gas, assuming complete combustion.

Gas turbine exhaust is not particularly suitable for recover of $CO_2$ due to a typical excess air ratio in the range of 3–3.5, which results in a $CO_2$ concentration of only 3–3.5 mol %. The main objective of this invention has therefore been to find a process which will produce a lower exhaust gas volume and/or a higher $CO_2$ content than conventional aero-derivative gas turbines.

A method for removing $CO_2$ from exhaust gases based on amine absorption patented as Fluor Daniel ECONAMINE FG process (Sander and Mariz, 1992), has been used in the method. The ECONAMINE FG process was developed in order to remove relatively low concentrations of $CO_2$, typically 3–10 vol %, from low pressure gases with a high oxygen content. The solvent chosen for absorption is monoethanolamine (MEA) due to its ability to absorb high $CO_2$ volumes per MEA volume. Recoveries between 85% and 95% of $CO_2$ present in exhaust gases at atmospheric pressure are possible, depending on the $CO_2$ content of the feed gas.

In the method, gas absorption membranes have also been employed for removal of $CO_2$ from exhaust gases, and this technology has already been tested for the removal of sulphur dioxide. Gas absorption membranes are used as contacting devices between a gas and a liquid flow. The separation is caused by the presence of an absorption liquid (MEA) on one side of the membrane which selectively removes certain components from the gas flow from the other side of the membrane. The replacement of conventional absorption columns with membranes can lead to significant reductions both with regard to cost and weight for the absorption unit.

In the absorption unit $CO_2$ is absorbed by MEA in the temperature range 20–70° C., it then enters the stripping column in which $CO_2$ is released from MEA in the temperature range of 120°–150° C. $CO_2$ is then compressed for injection, and MEA flows back to the absorption unit.

The invention has been tested by removing $CO_2$ from exhaust gases of four GE LM2500PE gas turbines installed on a typical gas compressor platform.

Fluor Daniel's ECONAMINE FG process was used to recover $CO_2$ from atmospheric exhaust gas. The plant was designed to remove $CO_2$ from 60% of the total exhaust gas flow. The rest of the exhaust gas is recycled to the gas turbine air compressor. This results in 1054 tons/day of recovered $CO_2$ based on four turbines. $CO_2$ is then compressed and sent to a subterranean reservoir or to another non-atmospheric destination. This treated exhaust gas is then vented to the atmosphere.

DETAILED DESCRIPTION

Figure 1:
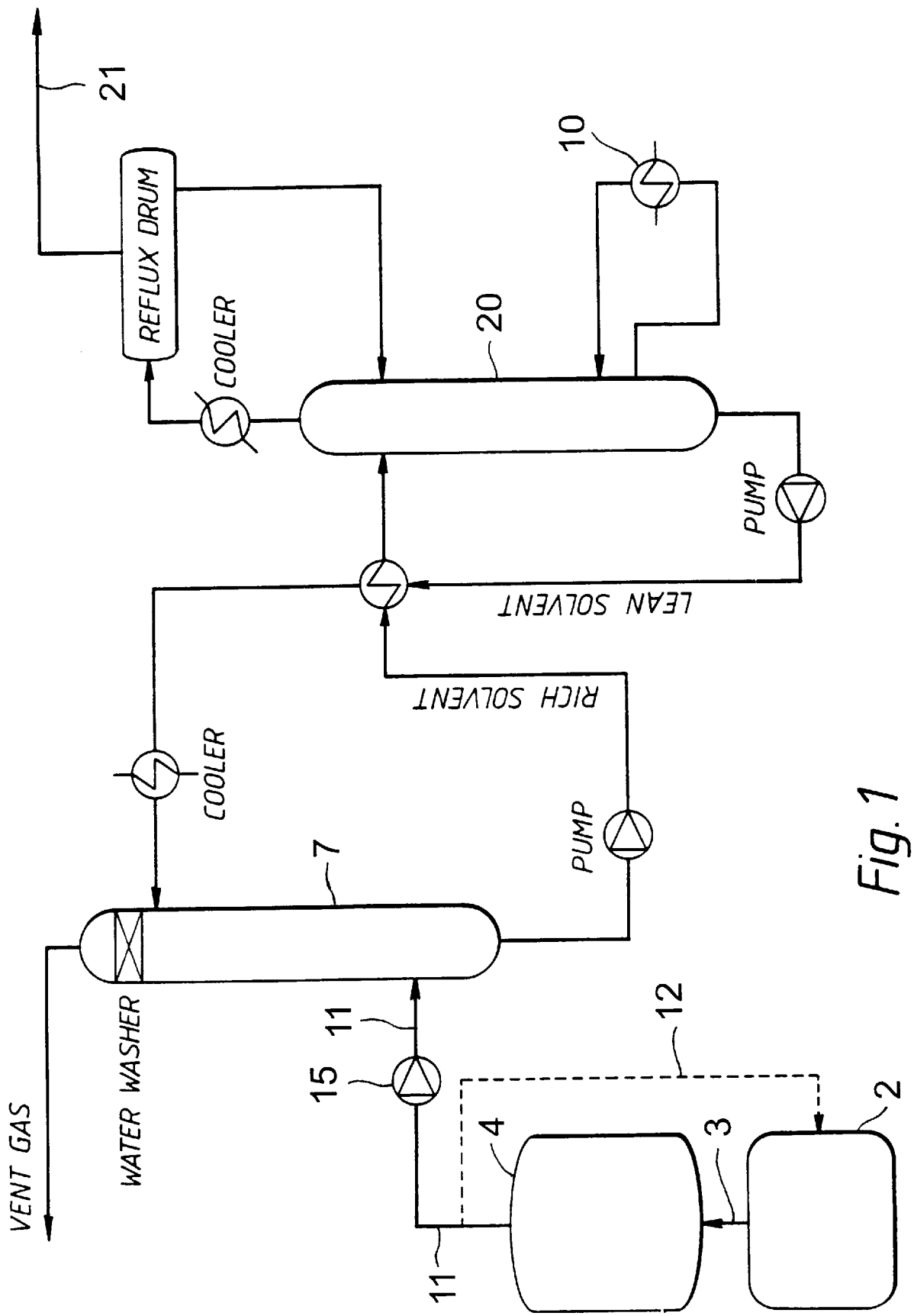
FIG. 1 is a diagrammatic view of a method in accordance with the present invention.
Figure 2:
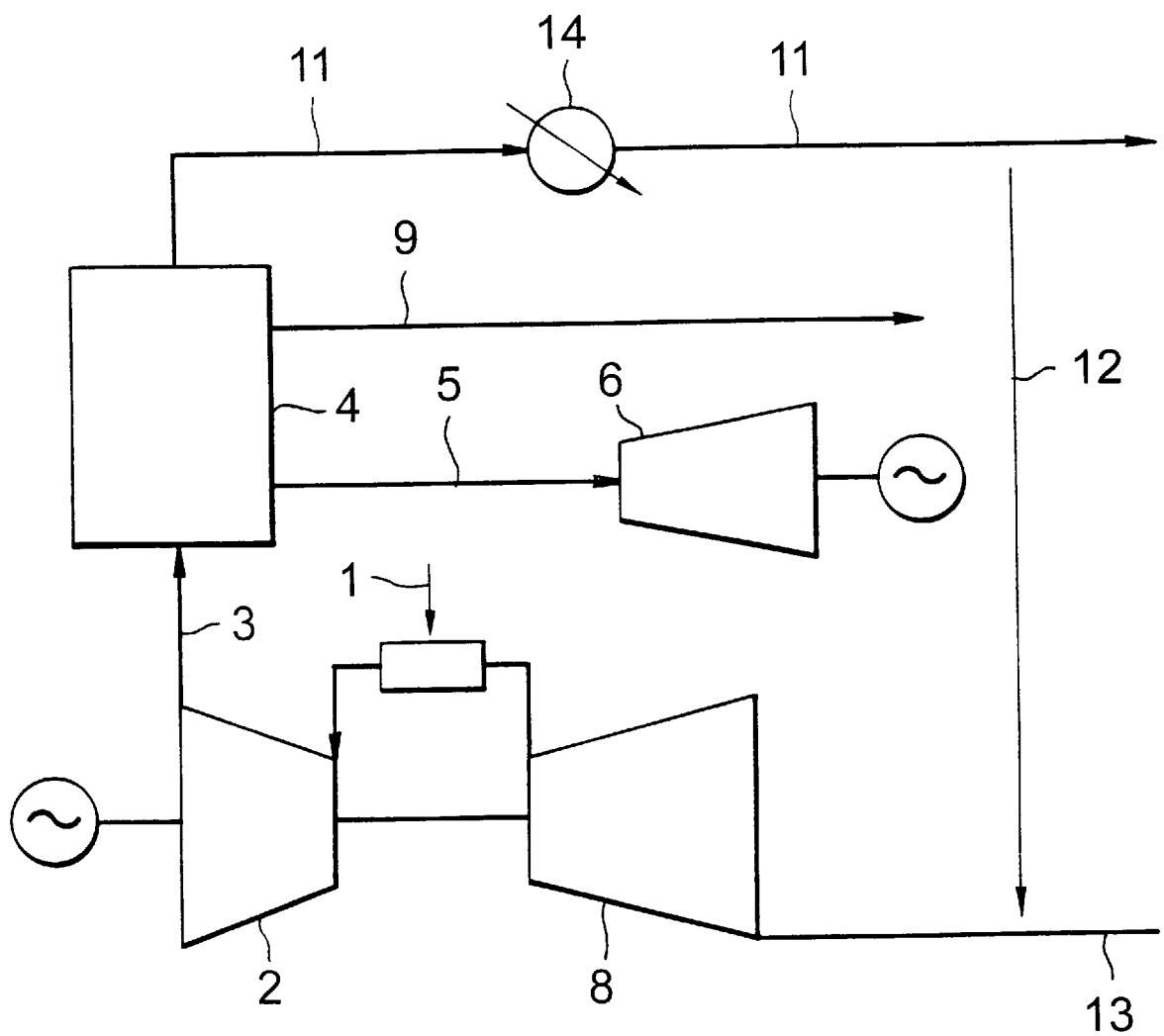
FIG. 2 is a heat recovery and power generation cycle of the method of FIG. 1.
Figure 3:
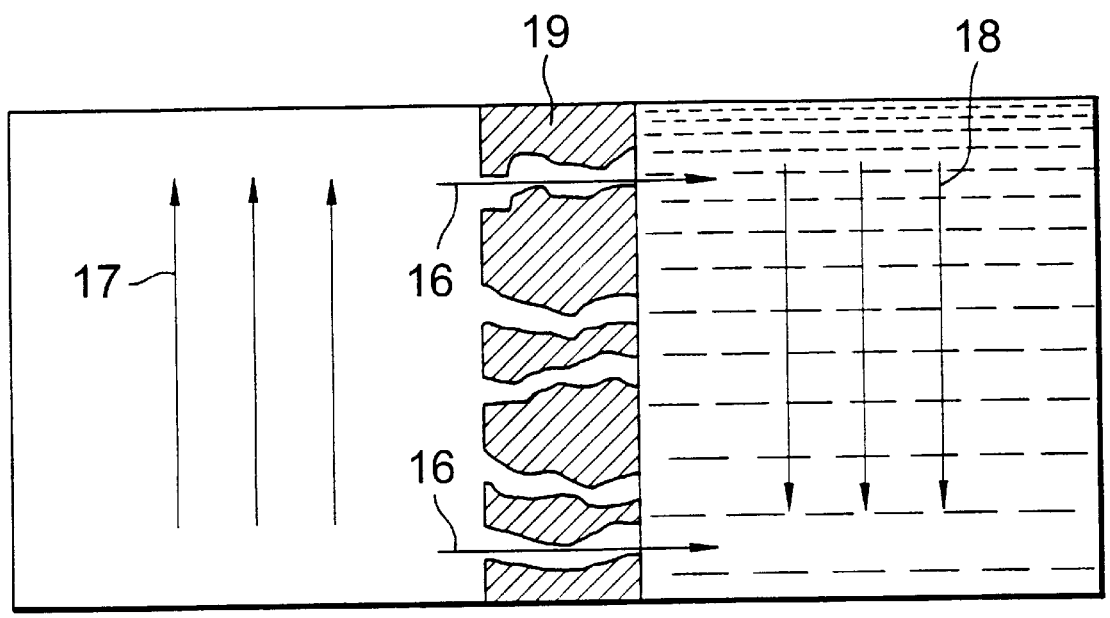
FIG. 3 is a gas absorption membrane used in the absorption column shown in FIG. 1 for the removal of $CO_2$ from exhaust gases.

As input to each of the four gas turbines, it is assumed that the consumption of fuel 1 is 1.282 kg/s with a lower heating value of 47562 KJ/kg and a composition as for an average North Sea gas.

After being expanded through the turbine 2, the exhaust gas 3 will enter a heat recovery steam generator (HRSG) 4. The HRSG 4 is designed for steam production at two pressure levels (40 and 4 bar). High pressure steam 5 is expanded through a steam turbine 6, the condensate leaving the steam turbine 6 is returned to the feed-water preheater and used in the process. The steam turbine 6 is coupled via a gear to an electrical generator which provides the absorption 7 and compression unit 8 with electricity. The steam turbine 6 produces approximately 3 MW of "surplus" energy per gas turbine 2 which can be utilized for other purposes on an offshore platform.

The low pressure steam 9 is used to heat the stripping column reboiler 10. The energy consumption in the reboiler 10 is determined by the characteristics of the absorption chemical.

In order to reduce the volume of exhaust gas 11 entering the absorption column 7 and thereby reduce the size and weight of the column, the gas turbine 2 is operated with recycling of exhaust gas 12. The exhaust gas 11 leaving the HRSG 4 is cooled to 30° C., and 40% of the total volume is recycled and mixed with fresh air 13 between the air filter and the compressor inlet. The principal limitation of recycling is the 02 content of the combustion air 13. Problems with instability and quenching of the flame may occur if the $O_2$ content is too low. 40% recycling for an LM2500 implies 16.5 mol % $O_2$ in the combustion air 13. According to the flammability limits, this should be on the conservative side. The molecular weight of air 13 flowing through the compressor 8 increases slightly when the exhaust gas 12 is recycled, but this effect is not regarded as significant. These assumptions have been accepted by General Electric; Rolls Royce too have generally accepted a high level of recycling.

The gas turbine 2 has been simulated in order to obtain performance data for design conditions with exhaust gas recycle 12. Performance data for an LM2500PE are given in Table 1.

TABLE 1

Performance data for an LM2500 PE with recycle.

| | |
|---|---|
| Power output | 21.3 MW |
| Fuel consumption | 1.282 kg/s |
| Efficiency | 34.8% |
| Exhaust gas temperature | 543° C. |
| Flow rate leaving HRSG | 66.9 kg/s |
| Flow rate abs. column inlet | 40 kg/s |
| Exhaust gas $CO_2$ content | 5.9 vol % |
| Turbine outlet pressure | 1.053 bar |
| Exhaust gas recycle | 40% |

The fuel energy supplied to each gas turbine 2 is 61.0 MW based on the lower heating value. The distribution of supplied fuel energy for four LM2500PE's is shown in Table 2.

TABLE 2

The utilization of fuel energy for four turbines (MW).

| | |
|---|---|
| Fuel energy input | 244 MW |
| Electrical output generated | 86.4 MW |
| Steam generation | 127.2 MW |
| | (25.6 of which are converted to electrical power and 52 are used for the stripping reboiler. 49.6 are losses in generator, converter and cooler) |
| Heat loss in exhaust gas cooler | 42.8 MW |
| | (a fraction of which is latent heat) |
| Total extraction of energy | 256.4 MW |
| | (an additional 12.4 MW due to condensation of water) |

The overall net efficiency for electrical power generation is 45.5%. When the heat which is passed to the stripping column reboiler 10 is included, the fuel energy utilization is 67%. The net efficiency for a simple cycle LM 2500 is 35.4%.

The chemical reaction for amine absorption is (reference: R. N. Maddow "Gas and Liquid sweetening", Campbell Petroleum Series, 1974):

$2(R-NH_2)+H_2O+CO_2-(R-NH_3)_2CO_3$ where $R=C_2H_4OH$

The reaction is reversible and the equilibrium can be altered by altering the temperature. $CO_2$ is absorbed by an absorption medium in the temperature range of 20°–70° C., and is released from MEA in the temperature range of 120°–150° C.

The exhaust gas 11 from the heat recovery and power generation unit 4 passes through an exhaust gas cooler 14 and an exhaust gas blower 15 before entering an absorption tower 7. Through the absorption column 7, the $CO_2$ 16 content of the exhaust gas 17 is reduced by means of a chemical reaction with the amine 18. The size of the absorption tower 7 can be reduced by utilizing advanced technology such as structured packings or gas absorption membranes 19.

The $CO_2$ 16 enriched MEA 18 is passed to a stripper 20 where the $CO_2$ 16 is released at temperatures of 120°–150° C. Degradation of the absorption chemical 18 will occur due to the formation of heat stable salts and other short chain compounds. These contaminants are removed in the MEA purification unit which is in operation for only a short time.

Gas absorption membranes 19 are membranes which are employed as contact devices between a gas and a liquid flow. The separation is caused by the presence of an absorption liquid 18 on one side of the membrane 19 which selectively removes certain components 16 from the gas flow 17 on the other side of the membrane 19. The membrane 19 is intended to provide a contacting area which prevents mixing of the gas 17 and the absorption liquid 18. The membrane 19, however, should be highly permeable to the component 16 which is required to be removed. The selectivity in the separation process is derived from the absorption liquid 18. A highly selective separation can be achieved through an appropriate choice of the absorption liquid 18.

The removal of exhaust gas components such as $CO_2$ 16 is achieved by the use of porous, hydrophobic membranes 19 in combination with suitable absorption liquids 18 (in this case the amine MEA). As a result of the membrane hydrophobicity and small pore size (normally 0.2 $\mu$m) the gas 17 and liquid flow 18 can be kept separate.

The use of gas absorption membranes 19 has several advantages over conventional contacting devices such as packed columns:

- Compactness of the equipment through the use of hollow fibre membranes.
- The height of the absorption column will be reduced to around ⅕ that of conventional columns.
- The operation of the contact equipment is independent of the gas and liquid flow rates.
- No entrainment, flooding, channeling or foaming.

The conventional stripping column can be replaced by a rotating gas/liquid contactor which is called HIGEE. This contactor appears to result in savings both with regard to cost, weight and especially reduction of area requirements.

The centrifugal forces, produced by rotating a bed of packing, act as an artificially high "g" force—thus the name "Higee". At the heart of a Higee is the packing, a reticulated material (usually metal), which has a very large surface area per m³ and a very high voidage. The specific area is normally 2500 m²/m³ with 90% voidage.

The Higee unit consists of a rotor containing the packing arranged in a torus, and a stationary housing. Two seals are incorporated, one shaft seal between the rotating shaft and the housing, and the other between the rotor and the gas/vapor outlet duct in order to prevent gas or vapor from bypassing the rotating packing. The Higee unit is illustrated in FIG. 4.

Gas (or steam when using Higee as a stripper) enters the housing via a tangential nozzle and flows inwards through the rotating packing. There it comes into intimate contact with the liquid, which has been distributed at the "eye" of the packing, and is forced outwards by the centrifugal forces. The gas (vapor) leaves the nozzle centered on the axis of the machine, while the droplets of liquid leaving the rotor impinge on the rotor's walls (or internals) and the liquid is drained from the housing.

At relatively modest speed, "g" forces are created from 100 up to 1000 times normal gravity. The resulting high shear force produces extremely thin films of liquid, which rapidly replenish the surface, and substantial turbulence, thus causing an extremely efficient mass transfer to take place. Typically, the depth of the packing corresponding to an actual plate is in the region of 1.5–2.5 cm rather than 30–244 cm in conventional packed towers. As in conventional mass transfer equipment, a satisfactory distribution of both gas and liquid phases is vital in achieving optimum performance.

The $CO_2$ resulting from the separation process can be disposed 21 of in several ways:

Ocean disposal

Liquid or solid $CO_2$ can be absorbed in sea water. The solubility of $CO_2$ in sea water increases with decreasing temperatures. The ecological effects of $CO_2$ disposal in the ocean are still not sufficiently well investigated and understood.

Enhanced oil recovery (EOR)

By injecting $CO_2$ into petroleum reservoirs, the oil recovery rate can be increased. $CO_2$ will be mixed with some of the oil which is present, and this mixture of $CO_2$ and oil will displace oil which cannot be displaced by traditional water injection.

One problem which may arise when using $CO_2$ for EOR is that the $CO_2$ in the production gas gradually will increase. If the gas is to be exported, the increase in carbon dioxide may affect the quality and saleability of the gas.

Disposal in depleted oil and gas reservoirs

Disposal of $CO_2$ in depleted reservoirs is considered to be safe as long as the injection pressure is below the original reservoir pressure. If the reservoir is filled with water, the possibility of $CO_2$ escaping the reservoir is greater.

Industrial use of $CO_2$

Carbon dioxide is used as a raw material for the chemical industry, especially for the production of urea, polycarbonate and alcohols. However, this does not represent an alternative to the disposal of large amounts of $CO_2$.

The main objective which must be fulfilled by the power generation unit is that the net power output from an LM2500 simple cycle gas turbine (approximately 21 MW) should be available regardless of the power and heat requirements for the $CO_2$ removal process. This introduced the necessity of a waste heat recovery unit (HRSG) 4 in which the exhaust gas 11 is cooled while simultaneously generating steam which can be utilized for the production of power and in addition supply the stripper reboiler 10 with saturated steam. The HRSG 4 has to supply a steam turbine 6 with sufficient superheated steam 5 in order to generate at least 3 MW of electricity which is the power requirement for the absorption and injection device. Generation of electricity exceeding this level could be used by the consumers on an offshore platform. In addition, the HRSG 4 has to supply saturated steam at a pressure of 4 bar for utilization in the stripper reboiler 10.

The temperature of the exhaust gas 11 is lowered to approximately 125° C. when recovering heat for steam generation with the present steam cycle. In the case of $CO_2$ removal by amine absorption it is necessary to cool the exhaust gas 11 further. An exhaust gas cooler 14 using sea water is required in order to reduce the temperature to 30° C. This temperature is chosen in order to obtain the optimum performance for the absorption column 7. The dew point of the exhaust gas 11 is approximately 42° C. A fraction of the water vapor in the exhaust gas 11 is therefore condensed through the exhaust gas cooler 14.

The current practice for conventional HRSG designs does not reflect the philosophy of the space and weight requirements which are established in the offshore oil industry. Emphasis is therefore made to design a compact, light weight and dual pressure HRSG. Short tubes with a small diameter were applied together with the smallest possible fin thickness and tube spacing. The heavy steam drums were avoided by using "the once through principle" which is usually employed in coal fired boilers with supercritical steam conditions.

Combined cycle with recycling of exhaust gas

A combined cycle with partial recycling of exhaust gas 12 was proposed, in order thereby to reduce the volume of exhaust gas for treatment in the absorption process. The exhaust gas 11 which leaves the HRSG 4 is cooled to 30° C., and some of the total volume of exhaust gas is recycled and mixed with fresh air between the air filter and compressor inlet.

The recycle ratio is mainly limited by the oxygen content in the combustion air 13. Flammability calculations of hydrocarbon fuels show that approximately 13 mol % of $O_2$ is sufficient to keep a flame burning, (SFPE, 1990). In the present study the limit was set at 16.5 mol % of $O_2$ in the combustion air. This implies a recycle ratio of 40% of the total exhaust gas volume.

Both General Electric and Rolls Royce have in general agreed that this recycle ratio will not significantly influence gas turbine performance, although detailed testing is necessary in order to verify this. Recycling of exhaust gas is a widely used method which is employed in $NO_x$ control from stationary sources (Wark and Warner, 1981). The increased gas volume acts as a thermal sink, reducing the overall combustion temperature. In addition, the oxygen concentration is lowered. This effect will also be present in gas turbine combustion. However, there are certain issues which must be taken into account with regard to recycling, including the following:

Recycled exhaust gas must be carefully mixed with air in order to ensure homogeneous characteristics.

With low $NO_x$ lean burn systems, it may be necessary to modify the design due to more vigorous mixing requirements.

Additional firing of the HRSG 4 in a combined cycle (i.e., using a duct burner between the turbine and the HRSG), increases the power output from the steam turbine 6, but the efficiency will be somewhat lower compared to a non-fired combined cycle. The $CO_2$ concentration of the exhaust gas 11 will increase. However, there is also an undesirable effect of additional firing; the volume of exhaust gas for treatment will increase due to the reduced recycle ratio. Combined with the fact that no need has been identified for the additional power output from the steam turbine 6, this leads to the conclusion that additional firing of the HRSG 4 is not feasible for $CO_2$ removal.

An alternative to installing $CO_2$ removal processes offshore will be to install high efficiency gas turbines. The efficiency of gas turbines which are operating in the North Sea today is seldom higher than 30–35%. Replacement of these gas turbines with new turbines with efficiencies exceeding 40% will therefore substantially reduce the $CO_2$ emissions.

We claim:

1. A method for removing and preventing emissions into the atmosphere of carbon dioxide ($CO_2$) from exhaust gases from gas turbines, for the production of oil and gas, comprising the following steps:

(a) introducing natural gas and air into a gas turbine in which natural gas is converted to mechanical energy;

(b) passing the exhaust gas from the gas turbine through a heat recovery unit for recovery of the heat content in the exhaust gas;

(c) after emitting heat in the heat recovery unit whereby the temperature of the exhaust gas has been reduced to 20°–70° C., passing the exhaust gas to an absorption column containing an absorption liquid, where the carbon dioxide is absorbed in said liquid, and the thereby purified exhaust gas which is essentially free of carbon dioxide, is vented to the atmosphere;

(d) passing the absorption liquid which contains $CO_2$ to a stripping column where the $CO_2$ is removed from the absorption liquid by heating to a temperature of 120°–150° C., thereby regenerating the absorption liquid; and (e) recycling the thereby regenerated absorption liquid which is essentially free of $CO_2$ to the absorption column and passing the separated $CO_2$ gas to a compression stage for compression and utilization or disposal;

wherein approximately 40% of the exhaust gas is recycled to the compressor stage for said gas turbine before the exhaust gas is passed to the absorption stage (c).

2. The method according to claim 1, wherein the heat recovery unit used is an exhaust heat boiler.

3. The method according to claim 1, further comprising employing a device as a gas absorption column said device comprising gas absorption membranes suitable for separating $CO_2$ gas from exhaust gases.

4. The method according to claim 1, wherein steam from the heat recovery plant is used to heat the stripping column and the steam is also used for the production of electrical energy via a high pressure steam turbine.

5. A method for removing and preventing emissions into the atmosphere of carbon dioxide ($CO_2$) from exhaust gases from gas turbines, for the production of oil and gas, comprising the following steps:

(a) introducing natural gas and air into a gas turbine in which natural gas is converted to mechanical energy;

(b) passing the exhaust gas from the gas turbine through a heat recovery unit for recovery of the heat content in the exhaust gas;

(c) after emitting heat in the heat recovery unit whereby the temperature of the exhaust gas has been reduced to 20°–70° C., passing the exhaust gas to an absorption column containing an absorption liquid, where the carbon dioxide is absorbed in said liquid, and the thereby purified exhaust gas which is essentially free of carbon dioxide, is vented to the atmosphere;

(d) passing the absorption liquid which contains $CO_2$ to a stripping column where the $CO_2$ is removed from the absorption liquid by heating to a temperature of 120°–150° C., thereby regenerating the absorption liquid; and (e) recycling the thereby regenerated absorption liquid which is essentially free of $CO_2$ to the absorption column and passing the separated $CO_2$ gas to a compression stage for compression and utilization or disposal;

wherein approximately 40% of the exhaust gas is recycled to the compressor stage for said gas turbine before the exhaust gas is passed to the absorption stage (c) and wherein steam from the heat recovery plant is used to heat the stripping column and the steam is also used for the production of electrical energy via a high pressure steam turbine.

* * * * *